Huling H. Parker
INVENTOR.

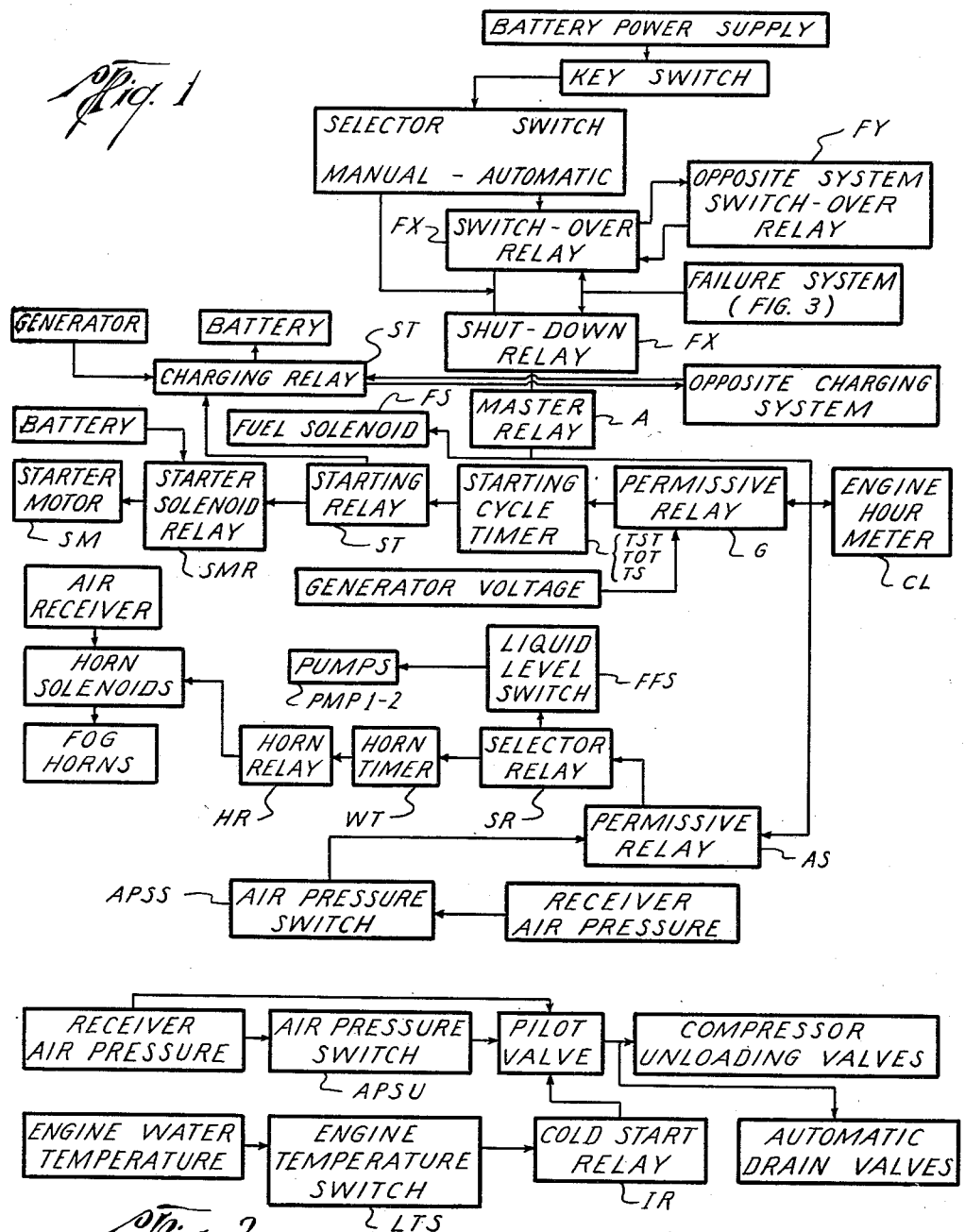

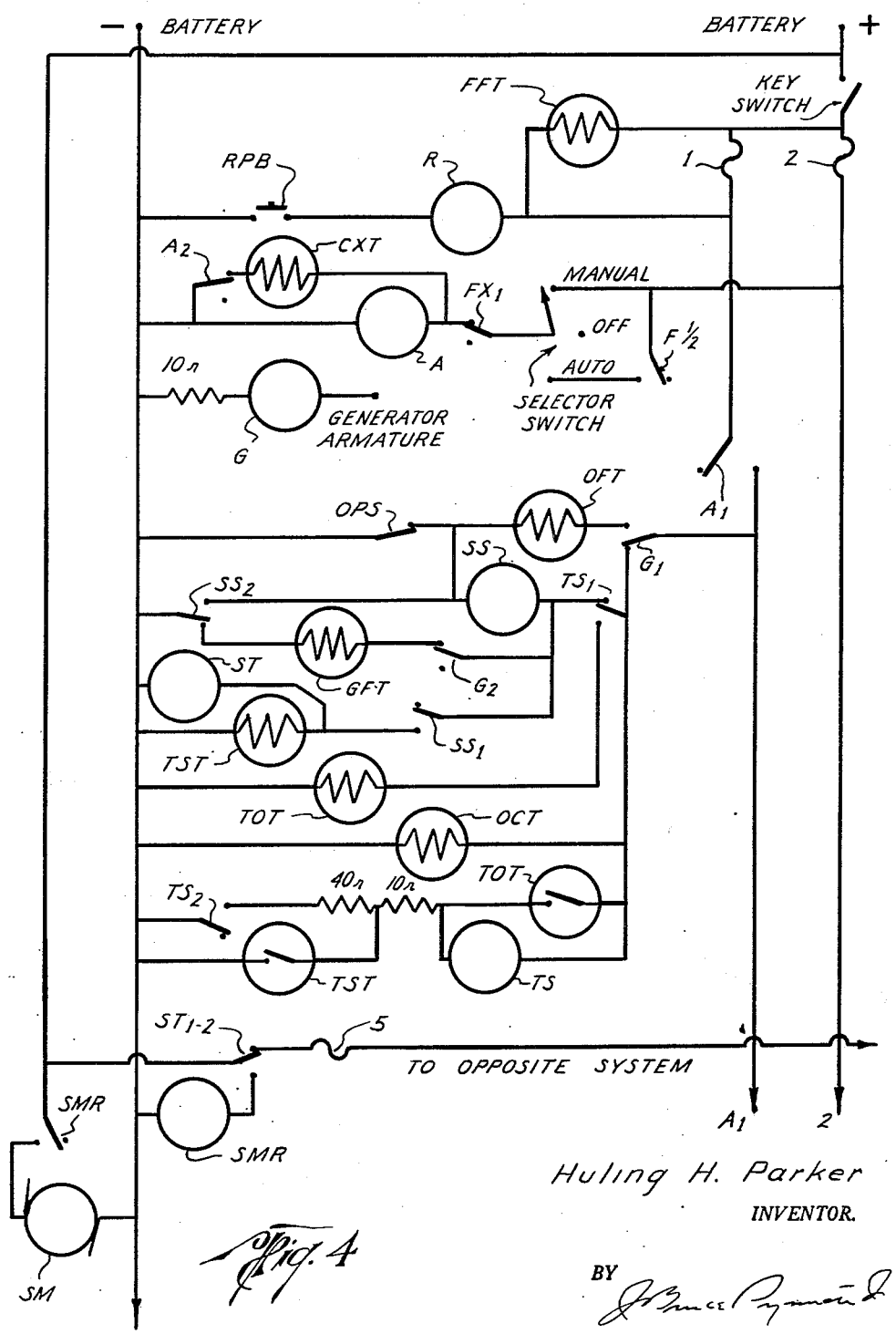

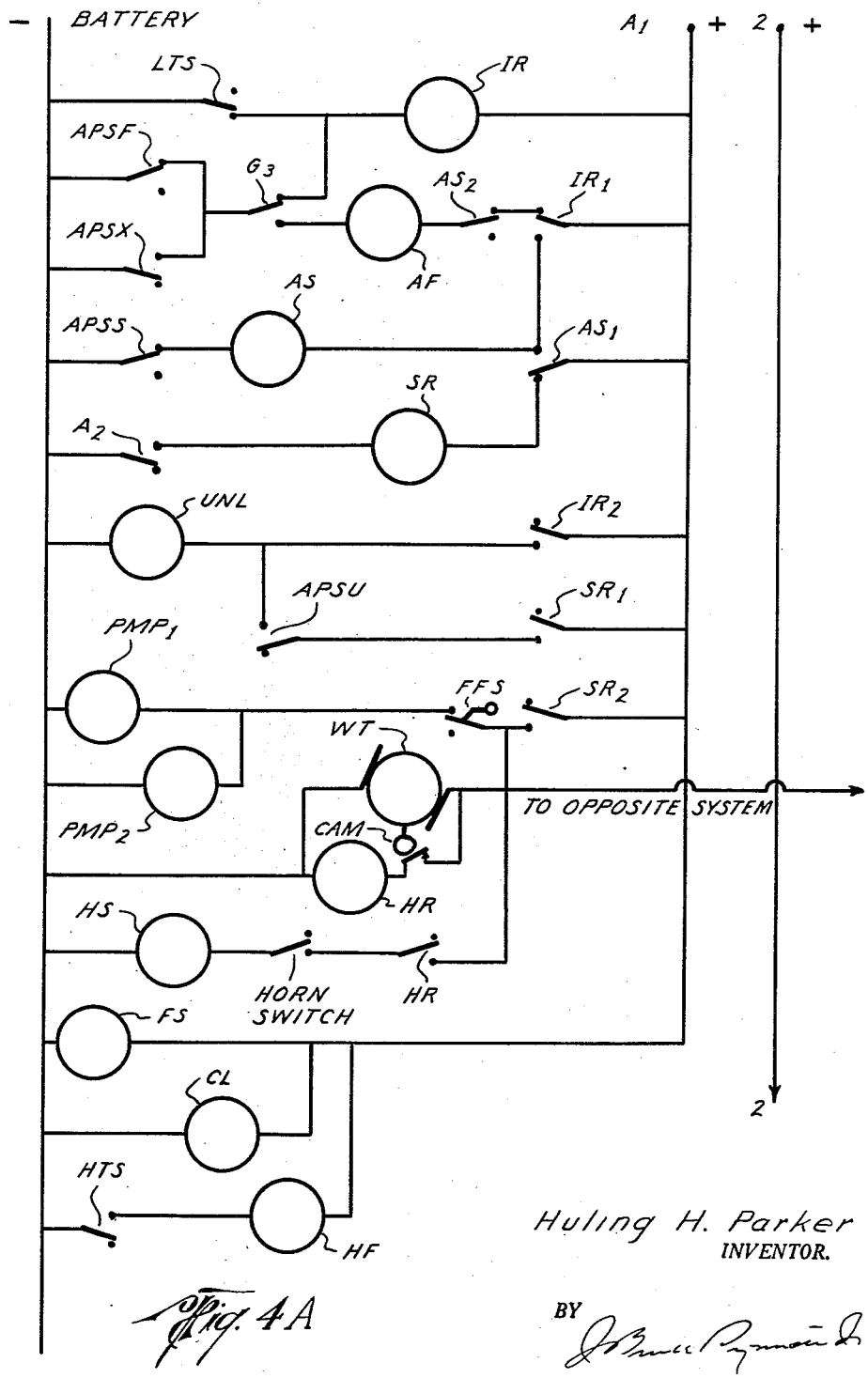

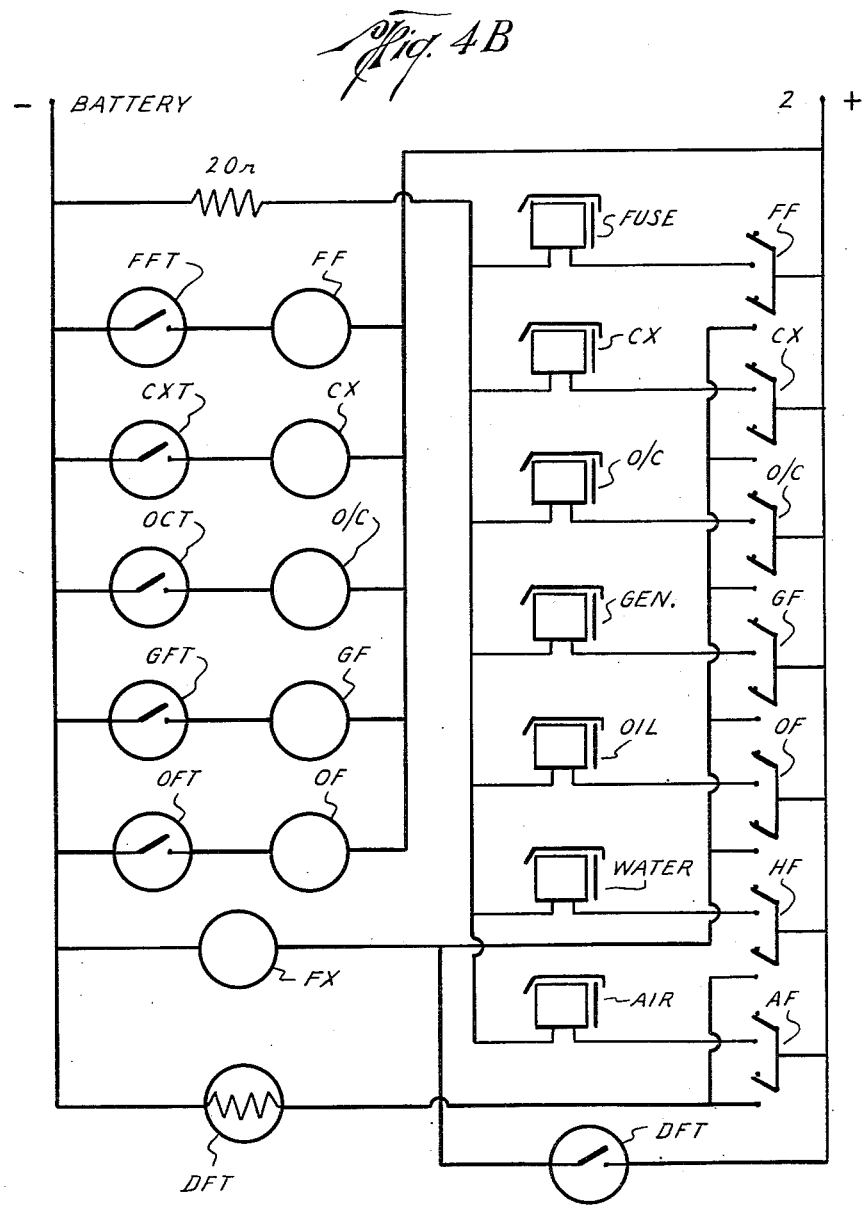

2,799,849

CONTROL MEANS FOR FOG SIGNAL

Huling H. Parker, Houston, Tex., assignor to The Light House, Inc., Houston, Tex., a corporation of Texas Application January 9, 1956, Serial No. 558,009

7 Claims. (Cl. 340—222)

The invention relates to control means for a fog signal, and it concerns more particularly a system of electrical controls for a diesel engine driven pneumatic fog signal comprising audible signal means for use in off-shore locations to indicate the presence of obstructions of any kind, as an aid to navigation.

The control means of the invention is intended specifically for use in conjunction with a fog signal comprising a pair of diesel engines and a pair of air compressors each driven by one of the engines, the compressors being arranged to supply air to a common air receiver for use in the operation of a pneumatic signal device, which may consist of one or more air operated fog horns having timing means whereby they are capable of being operated intermittently and for periods of predetermined duration, one of the engine and compressor units being arranged to serve as a standby unit while the other unit is in operation.

It is an object of the invention to provide fully automatic and thoroughly dependable control means capable of selectively and automatically starting one of the engine and compressor units, and thereafter positively and automatically insuring the continued, safe operation of the signal for long periods of time. The signal may be left unattended while in operation for periods of as long as two weeks, for example. The control means of the invention includes means for positively and automatically shutting down the operating engine and compressor unit, and starting the standby unit, upon the occurrence of failure due to any one of several possible causes, and means for positively and automatically detecting and recording the cause of such failure.

Another object of the invention is to provide control means for the purpose described which requires only a comparatively small amount of electricity for its operation, whereby the available power supply may be conserved.

The invention will be readily understood by referring to the following description and the accompanying drawing, the several views of which show substantially one-half of the apparatus to which they relate, being such portion of the apparatus as is required to control the operation of one of the engine and compressor units. The apparatus shown is substantially duplicated for the opposite engine and compressor unit.

In the drawing,

Fig. 1 is a block type flow diagram showing a portion of control means embodying the invention which relates to the selection, for subsequent operation, of one of the engine and compressor units, the starting of the selected unit, the shutting down of such unit and the starting of the opposite unit;

Fig. 2 shows a portion of the control means which relates to the loading and unloading of the compressors;

Figure 3:
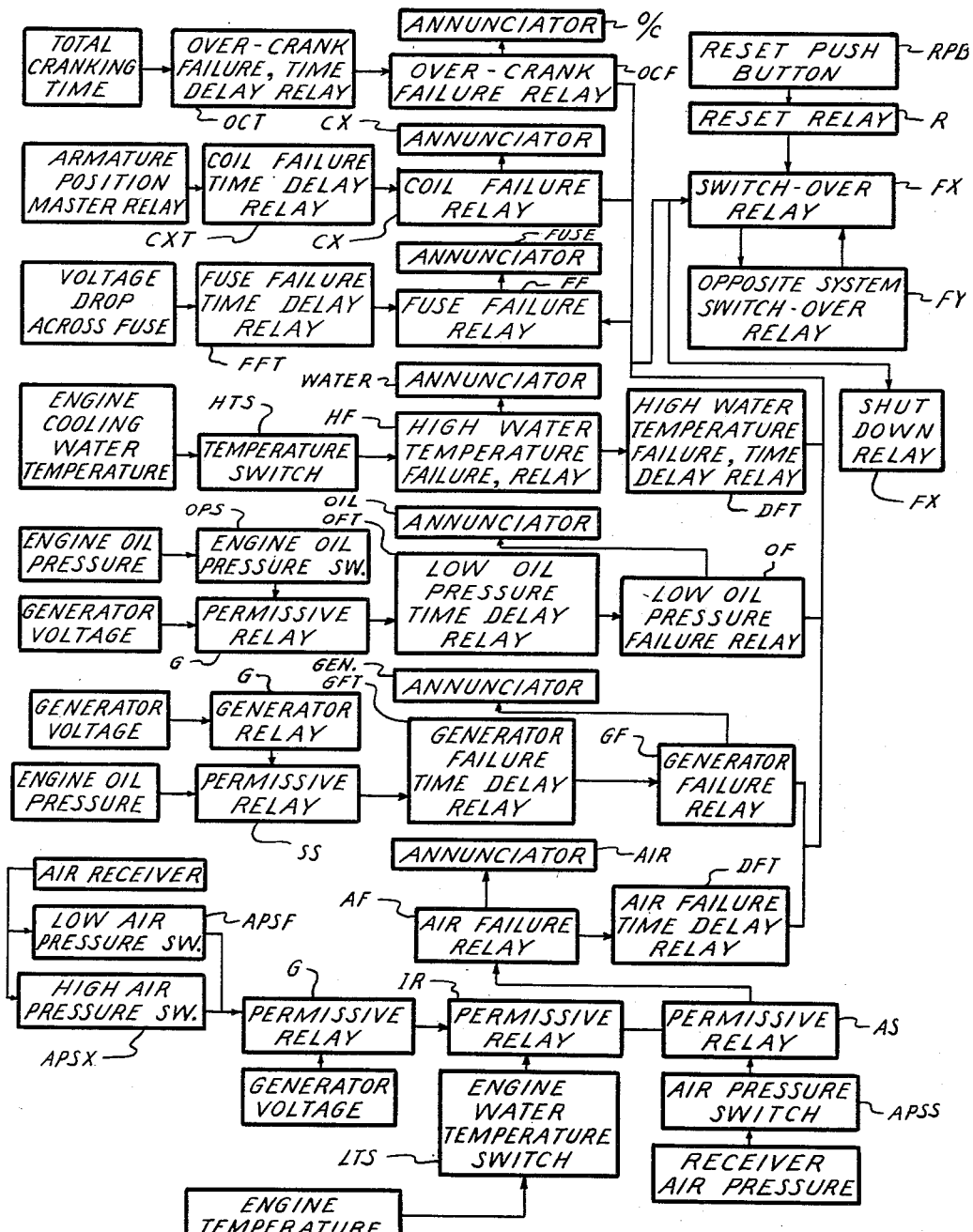

Fig. 3 shows a portion of the control means, indicated generally in Fig. 1, which relates to the shutting down of the operating unit upon the occurrence of failure due to any one of several possible causes, the detection and recording of such cause of failure, and the starting of the opposite unit; and Figs. 4, 4A and 4B together comprise a schematic electrical diagram of the control means of the invention.

Referring to the drawing, the control means of the invention includes a number of relays, as hereinafter described, each of which includes a coil and an armature carrying one or more movable contacts. Each of the movable contacts is capable of selectively engaging one of a pair of fixed contacts, one of the fixed contacts being normally open and the other being normally closed. Each of the relays is of a type in which the movable contacts each completely disengage one of the fixed contacts before engaging the other. As shown in Figs. 4, 4A and 4B, each of the relays is in its deenergized position.

Each of the engine and compressor units includes a battery, which provides a source of electric power for use in starting the engine and for other purposes, as hereinafter described, and a generator which is driven by the engine and which charges the battery.

The positive terminal of the battery is connected to a key operable switch, one of which is provided for each unit, which controls the supply of electricity to the control means of the unit. The key operable switches of the two units advantageously may be connected mechanically so that they may be operated simultaneously by means of a single key.

The control means of each unit is arranged in two groups of parallel electrical circuits, as hereinafter described, which are connected to the terminals of the battery by common leads. The circuits of each of such groups are connected directly, by a common lead or ground, to the negative terminal of the battery. The circuits of one of the groups are connected by a common lead to the normally open contact $A_1$ of a master relay A, and are capable of being connected to the key operable switch when the master relay A is energized, while the circuits of the other group are connected directly, by a common lead, to the key operable switch. Fuses 1 and 2 are provided in the leads connecting the key operable switch to the normally open contact $A_1$ of the master relay A, and to the circuits of the last mentioned group, respectively.

The coil of the master relay A is connected to the key operable switch by a circuit which includes the normally closed contact $FX_1$ of a failure relay FX and a selector switch whereby it is capable of being selectively connected, manually, to the key operable switch, whereby it is energized, or alternatively, to the normally open contact $FY_2$ of a failure relay FY, which is the failure relay of the opposite system corresponding to the failure relay FX, whereby it is connected to the key operable switch automatically upon energizing the failure relay FY. The circuit connecting the master relay A to the key operable switch is broken, whereby the master relay A is deenergized, upon energizing the failure relay FX. The failure relays FX and FY are identical in function, and are capable of being energized, respectively, upon the occurrence of failure in the operating unit due to any one of several possible causes, as hereinafter described.

A fuel solenoid FS, which when energized is capable of opening a valve in the fuel line to the engine, and a clock CL, which records the time that the engine is in operation, each have one lead connected to the normally open contact $A_1$ of the master relay A, and are operable upon energizing the master relay A.

Each of the engine and compressor units includes a starter motor S, which is connected to the positive terminal of the battery by a circuit which includes the normally open contact of a starter solenoid relay SMR, whereby the starter motor SM is capable of being operated upon energizing the starter solenoid relay SMR. The starter solenoid relay SMR is connected to the positive terminal of the battery by a circuit which includes the normally open contacts $ST_1$ and $ST_2$ of a starting relay ST, and is capable of being energized upon energizing the starting relay ST.

The batteries of the two units are normally connected to each other, so that the generator of the operating unit is capable of acting upon the battery of the standby unit as well as the battery of the operating unit, to keep it fully charged at all times. The battery of the standby unit is automatically disconnected from the battery of the operating unit, as hereinafter described, while attempting to start the engine of the operating unit, to prevent the battery of the standby unit from being discharged.

The battery of the unit shown is connected to the battery of the opposite unit by a circuit which includes the normally closed contacts $ST_1$ and $ST_2$ of the starting relay ST, and which also includes a fuse 5. When the starting relay ST is energized, it causes the starter solenoid relay SMR to be energized, as above described, completing the circuit between the battery and the starter motor SM. Simultaneously the circuit connecting the battery of the unit shown to the battery of the opposite unit is broken by the action of the starting relay ST.

The starting relay ST is connected to the normally open contact $A_1$ of the master relay A by a circuit which includes the normally open contact $SS_1$ of a safety starting relay SS, the normally closed contacts $TS_1$ of a starting cycle timing relay TS, and the normally closed contact $G_1$ of a generator relay G, whereby the starting relay ST is capable of being energized upon energizing the master relay A and the safety starting relay SS. The circuit connecting the starting relay ST to the normally open contact $A_1$ of the master relay A is broken upon energizing either the generator relay G or the starting cycle timing relay TS.

The safety starting relay SS, like the starting relay ST, is connected to the normally open contact $A_1$ of the master relay A by a circuit which includes the normally closed contact $TS_1$ of the starting cycle timing relay TS and the normally closed contact $G_1$ of the generator relay G. Unlike the starting relay ST, which is connected directly to the negative terminal of the battery, the safety starting relay SS is connected to the negative terminal of the battery by a circuit which includes a normally closed oil pressure switch OPS. The safety starting relay SS is capable of being energized upon energizing the master relay A. The circuit connecting the safety starting relay SS to the normally open contact $A_1$ of the master relay A is broken upon energizing either the generator relay G or the starting cycle timing relay TS.

The oil pressure switch OPS, which is normally closed, is capable of being opened in response to the oil pressure of the operating engine.

Upon energizing the safety starting relay SS, the normally open contact $SS_2$ thereof is closed whereby the safety starting relay SS is connected to the negative terminal of the battery independently of the circuit which includes the normally closed oil pressure switch OPS.

The generator relay G has one lead connected directly to the armature of the generator and the other lead connected directly to the negative terminal of the battery, and is energized by electricity supplied by the generator as long as the generator is in operation and functioning normally.

The starting relay ST cannot be energized, and the starter motor SM cannot be operated, as long as the engine is running, as evidenced by the generator voltage.

The time that the starting relay ST is energized, as above described, is controlled by a time starting timer TST, which consists of a bimetallic strip type thermal switch is capable of being closed, after a predetermined period of time has elapsed, upon energizing a resistance, the time starting timer TST being connected in parallel relation to the starting relay ST.

The starting cycle timing relay TS is connected to the normally open contact $A_1$ of the master relay A by a circuit which includes the normally closed contact $G_1$ of the generator relay G, and to the negative terminal of the battery by the normally open contact of the time starting timer TST, and is capable of being energized by the action of the time starting timer TST. When the starting cycle timing relay TS is energized, the circuit which connects the starting relay ST to the normally open contact $A_1$ of the master relay A is broken, as above described, and at the same time a circuit is completed which includes the normally open contact $TS_2$ of the starting cycle timing relay TS, which is connected in parallel relation to the normally open contact of the time starting timer TST, so that the starting cycle timing relay TS is connected to the negative terminal of the battery independently of the circuit which includes the normally open contact of the time starting timer TST.

The time that the starting relay ST is not energized is controlled by a time off timer TOT, which is similar to the time starting timer TST and which is connected to the normally open contact $A_1$ of the master relay A by a circuit which includes the normally open contact $TS_1$ of the starting cycle timing relay TS and the normally closed contact $G_1$ of the generator relay G. The circuit which includes the time off timer TOT is completed at the same time that the circuit which includes the time starting timer TST is broken by the action of the starting cycle timing relay TS.

The normally open contact of the time off timer TOT is connected in parallel relation to the starting cycle timer relay TS, and the starting cycle timer relay TS is capable of being deenergized by the action of the time off timer TOT, the normally open contact of which, when closed, shunts the coil of the starting cycle timer relay TS.

The starting cycle, as above described, may be repeated a predetermined number of times, as hereinafter described, or until the engine is started.

The compressors are operated at constant speed, and the pressure in the air receiver is maintained substantially constant by loading and unloading the compressor of the operating unit, as hereinafter described. During the operation of each of the compressors, valves controlling the supply of air from the air receiver to the operating compressor, whereby the suction and discharge valves of the compressor are opened to unload the compressor, are continually opened and closed as necessary to maintain the desired pressure in the air receiver.

An unloading valve solenoid UNL, which controls the operation of the compressor unloading valves as well as the automatic drain valves of the air receiver, has one lead connected to the negative terminal of the battery, and is connected to the normally open contact $A_1$ of the master relay A by a circuit which includes the normally open contact $IR_2$ of an isolation relay IR.

The isolation relay IR has one lead connected to the normally open contact $A_1$ of the master relay A, and is connected to the negative terminal of the battery by a circuit which includes a normally closed engine temperature switch LTS. The engine temperature switch LTS is set to open when the cooling water temperature of the operating engine rises above a predetermined temperature.

The isolation relay IR is also connected to the negative terminal of the battery by a circuit which includes the normally closed contact $G_3$ of the generator relay G and a normally closed air pressure switch APSF, hereinafter referred to.

The isolation relay IR is energized, whereby the compressor unloading valves are opened as above described and pressure does not begin to build up in the air receiver, until the cooling water temperature of the operating engine has reached a predetermined temperature and the generator voltage has reached a predetermined voltage, indicating that the engine has been started and is operating normally.

The unloading valve solenoid UNL is also connected to the normally open contact $A_1$ of the master relay A by a circuit which includes a normally open air pressure unloading switch APSU and the normally open contact $SR_1$ of a selector relay SR. The unloading valve solenoid UNL is capable of being energized, whereby the operating compressor is unloaded and the automatic drain valves of the air receiver are opened, upon closing the air pressure unloading switch APSU and upon energizing the selector relay SR.

The air pressure unloading switch APSU is set to close when the pressure in the air receiver rises above a predetermined pressure corresponding to the highest operating pressure normally maintained in the air receiver.

The selector relay SR is connected to the negative terminal of the battery by the normally open contact $A_2$ of the master relay A, and is connected to the normally open contact $A_1$ of the master relay A by a circuit which includes the normally closed contact $AS_1$ of an air safety relay AS, whereby the selector relay SR is capable of being energized upon energizing the master relay A. The circuit connecting the selector relay SR to the normally open contact $A_1$ of the master relay A is broken upon energizing the air safety relay AS.

The air safety relay AS is connected to the negative terminal of the battery by a circuit which includes a normally closed air pressure starting switch APSS, and is connected to the normally open contact $A_1$ of the master relay A by a circuit which includes the normally open contact $IR_1$ of the isolation relay IR. The air safety relay AS is capable of being energized upon energizing the isolation relay IR.

Upon energizing the air safety relay AS a circuit is completed which includes the normally open contact $AS_1$ of the air safety relay AS, and which is connected in parallel relation to the circuit which includes the normally open contact $IR_1$ of the isolation relay IR, whereby the air safety relay AS is connected to the normally open contact $A_1$ of the master relay A independently of the normally open contact $IR_1$ of the isolation relay IR.

The circuit connecting the air safety relay AS to the negative terminal of the battery is broken upon opening the air pressure starting switch APSS. The air pressure starting switch APSS is set to open when the pressure in the air receiver rises above a predetermined pressure corresponding to the lowest operating pressure normally maintained in the air receiver.

The air safety relay AS is capable of being energized until the engine has been started and is operating normally, as evidenced by the generator voltage and the temperature of the engine cooling water, and as long thereafter as the pressure in the air receiver remains below a predetermined pressure corresponding to the pressure setting of the air pressure starting switch APSS.

A horn solenoid HS, which controls the operation of the air operated fog horns, has one lead connected to the negative terminal of the battery, and is connected to the normally open contact $A_1$ of the master relay A by a circuit which includes a horn switch whereby it may disconnected manually, and in addition, the normally open contact of a horn relay HR and the normally open contact $SR_2$ of the selector relay SR. The horn solenoid HS is common to the two engine and compressor units, and is capable of being energized upon energizing the selector relay SR and upon energizing the horn relay HR, which likewise is common to the two units. The horn relay HR advantageously may be of the mercury switch type.

The horn relay HR has one lead connected to the negative terminal of the battery, and is connected to the normally open contact $A_1$ of the master relay A by a circuit which includes a horn timing device WT and the normally open contact $SR_2$ of the selector relay SR. The horn timing device WT consists of a motor having one lead connected to the negative terminal of the battery and having another lead connected to the normally open contact $SR_2$ of the selector relay SR, a cam driven by the motor and a normally open contact connected in series with the horn relay HR and acted upon by the cam whereby it is alternately opened and closed for periods of predetermined duration. The horn relay HR is common to the two engine and compressor units, and is capable of being energized intermittently in response to the action of the horn timing device WT, which likewise is common to the two units, upon energizing the selector relay SR.

The invention contemplates that fuel may be supplied to the operating engine from an overhead fuel tank, from which fuel may flow by gravity upon energizing the fuel solenoid FS, above referred to. Fuel withdrawn from the fuel tank may be replaced, during the operation of the engine, with fuel supplied thereto from a storage tank of larger capacity. For this purpose a pair of electric pumps $PMP_1$ and $PMP_2$ may be provided, the pumps $PMP_1$ and $PMP_2$ being common to the two engine and compressor units.

Each of the pumps $PMP_1$ and $PMP_2$ has one lead connected to the negative terminal of the battery, and is connected to the normally open contact $A_1$ of the master relay A by a circuit which includes the normally closed contact of a float operable switch FFS and the normally open contact $SR_2$ of the selector relay SR. The pumps $PMP_1$ and $PMP_2$ are capable of being operated, upon energizing the selector relay SR, as long as the supply of fuel in the fuel tank remains below a predetermined level.

A fuse failure relay FF has one lead connected to the fuse 2, which in turn is connected directly to the positive terminal of the battery, and is connected to the negative terminal of the battery by a circuit which includes the normally open contact of a fuse failure timer FFT. The fuse failure timer FFT is a delayed action relay, and includes a bimetallic strip type thermal switch which is heated by a resistance whereby the switch is closed, upon energizing the resistance, after a predetermined period of time has elapsed. The fuse failure timer FFT is connected in parallel relation to the fuse 1, and is capable of being energized when the circuit which includes the fuse 1 is broken as a result of current overload.

A coil failure relay CX has one lead connected to the fuse 2, and is connected to the negative terminal of the battery by a circuit which includes the normally open contact of a coil failure timer CXT. The coil failure timer CXT, which is similar to the fuse failure timer FFT, is connected in parallel relation to the master relay A by a circuit which includes the normally closed contact $A_2$ of the master relay A, and is capable of being energized upon failure of the coil of the master relay A.

An over crank failure relay O/C has one lead connected to the fuse 2, and is connected to the negative terminal of the battery by a circuit which includes the normally open contact of an over crank failure timer OCT. The over crank failure timer OCT, which likewise is similar to the fuse failure timer FFT, has one lead connected to the negative terminal of the battery, and is connected to the normally open contact $A_1$ of the master relay A by a circuit which includes the normally closed contact $G_1$ of the generator relay G.

The over crank failure timer OCT is energized continuously during the starting cycle, and controls the duration thereof. The circuit connecting the over crank failure timer OCT to the normally open contact $A_1$ of the master relay A is broken upon energizing the generator relay G, which indicates that the engine is running.

A generator failure relay GF has one lead connected to the fuse 2, and is connected to the negative terminal of the battery by a circuit which includes the normally open contact of a generator failure timer GFT. The generator failure timer GFT, which likewise is similar to the fuse failure timer FFT, is connected to the negative terminal of the battery by a circuit which includes the normally closed contact SS₂ of the safety starting relay SS, and is connected to the normally open contact A₁ of the master relay A by a circuit which includes the normally closed contacts G₁ and G₂ of the generator relay G and the normally closed contact TS₁ of the time starting relay TS.

The circuit connecting the generator failure timer GFT to the normally open contact A₁ of the master relay A is broken upon energizing the generator relay G, which is capable of being energized when the generator voltage exceeds a predetermined voltage. The circuit connecting the generator failure timer GFT to the negative terminal of the battery is broken upon energizing the safety starting relay SS, which occurs during the starting action when there is no generator voltage and no oil pressure.

An oil failure relay OF has one lead connected to the fuse 2, and is connected to the negative terminal of the battery by a circuit which includes the normally open contact of an oil failure timer OFT. The oil failure timer OFT, which likewise is similar to the fuse failure timer FFT, is connected to the normally open contact A₁ of the master relay A by a circuit which includes the normally open contact G₁ of the generator relay G, and is connected to the negative terminal of the battery by a circuit which includes the normally closed oil pressure switch OPS.

The oil failure timer OFT is capable of being energized when the engine oil pressure is lower than a predetermined pressure, as evidenced by the closing of the oil pressure switch OPS, as long as the engine is running and the generator voltage exceeds a predetermined voltage, as evidenced by the closing of the normally open contact G₁ of the generator relay G.

A water temperature failure relay HF has one lead connected to the normally open contact A₁ of the master relay A, and is connected to the negative terminal of the battery by a circuit which includes a normally open engine temperature switch HTS, which is responsive to the temperature of the engine cooling water and is capable of being closed when the temperature of the engine cooling water rises above a predetermined temperature.

An air failure relay AF is connected to the normally open contact A₁ of the master relay A by a circuit which includes the normally closed contact AS₂ of the air safety relay AS and the normally closed contact IR₁ of the isolation relay IR. The air failure relay AF is connected to the negative terminal of the battery by a circuit which includes the normally open contact G₃ of the generator relay G and the normally closed air pressure switch APSF. A normally open air pressure switch APSX is connected in parallel relation to the air pressure switch APSF.

Each of the air pressure switches APSF and APSX is responsive to the air pressure in the air receiver. The air pressure switch APSF is set to open when the air pressure in the air receiver rises above a predetermined pressure, which may be lower than the pressure at which the air pressure switch APSS, above referred to, is set to open, while the air pressure switch APSX is set to close when the air pressure in the air receiver rises above a predetermined pressure, which may be higher than the pressure at which the air pressure switch APSU, above referred to, is set to close.

The air failure relay AF is capable of being energized when the pressure in the air receiver falls below a predetermined pressure corresponding to the pressure setting of the air pressure switch APSF, as long as the engine is running and operating normally, as evidenced by the generator voltage and the temperature of the engine cooling water, or alternatively, when the pressure in the air receiver rises above a predetermined pressure corresponding to the pressure setting of the air pressure switch APSX.

A plurality of annunciators, each corresponding to one of the failure relays FF, CX, O/C, GF, OF, HF and AF, and which are identified, respectively, by the legends Fuse, CX, O/C, GEN, Oil, Water and Air, each have one lead connected to the negative terminal of the battery, and is connected to the fuse 2 by a circuit which includes one of two normally open contacts of the corresponding failure relay.

The failure relay FX has one lead connected to the negative terminal of the battery, and is connected to the fuse 2 by each of five parallel circuits, each of which includes one of the normally open contacts of one of the failure relays FF, CX, O/C, GF and OF. The failure relay FX is also connected to the fuse 2 by a circuit which includes the normally open contact of a delayed failure timer DFT. The delayed failure timer DFT, which is similar to the delayed failure timers FFT, CXT, OCT, GFT and OFT, has one lead connected to the negative terminal of the battery, and is connected to the fuse 2 by each of two parallel circuits, each of which includes one of the normally open contacts of one of the failure relays HF and AF.

Upon the ocurrence of failure due to any one of the possible causes indicated, the failure relay FX is energized whereby the operating engine is shut down and the opposite engine is started, as above described. If the operating engine should stop running for any reason other than those indicated, it will attempt to restart itself automatically.

The failure relay FX, and the corresponding relay FY of the opposite unit, each include a latch whereby the armature of the relay is automatically and mechanically latched in place upon energizing the relay, and a reset solenoid R which is capable, when energized, of acting upon the latch to disengage it from the armature of the relay. The reset solenoid R has one lead connected to the fuse 1, and is connected to the negative terminal of the battery by a circuit which includes a reset push button RPB. The failure relay FX cannot be reset as long as the fuse 1 is faulty or a fuse failure exists.

In commencing the operation of the fog signal above described, the selector switch corresponding to the engine and compressor unit which is selected for operation initially is set in the "manual" position, while the selector switch of the opposite unit is set in the "off" position. The key switches, which control the supply of electricity to the control means of the two units, as above described, are turned on, and the reset push buttons RPB of the two units are engaged whereby the failure relay FX, and the corresponding failure relay FY of the opposite unit, are unlatched. After the selected engine has been started and is in operation, the selector switch of the standby unit is set in the "automatic" position, whereby the standby unit is capable of being started automatically in response to the action of the failure relay FX, as above described.

An important feature of the invention is that each of the failure controls above described, which are capable of shutting down the operating engine and starting the standby engine upon the occurrence of failure due to any one of several possible causes, is capable of a delayed action whereby it is isolated from the remainder of the system during periods of initial starting, so that the operating engine cannot be shut down prematurely by the action of such controls.

The invention may be modified in various ways without departing from the spirit and scope thereof.

I claim:

1. In a fog signal comprising a pair of engine and compressor units each consisting of a diesel engine and an air compressor capable of being driven by the engine, the engine and compressor units being operable selectively and one of the units being capable of acting as a standby unit while the other unit is in operation, an air receiver common to the two engine and compressor units and capable of receiving air from the compressor of the operating unit, and one or more air horns capable of being supplied with air from the air receiver, the combination of two substantially identical control systems each corresponding to one of the engine and compressor units, each of the control systems including relay operable control means capable of performing selected functions relating to the starting of the engine, the loading of the compressors whereby a substantially constant pressure is maintained in the air receiver, the operation of the air horns and the detection of failure due to any one of several possible causes, such control means including a plurality of delayed action type relays each capable, when energized, of completing a circuit after a predetermined period of time has elapsed, each of the delayed action type relays being capable of being energized upon the occurrence of failure due to one of such possible causes, and relay means common to the several delayed action type relays and capable of shutting down the operating unit and starting the standby unit in response to the action of each of the delayed action type relays.

2. In a fog signal comprising a pair of engine and compressor units each consisting of a diesel engine and an air compressor capable of being driven by the engine, the engine and compressor units being operable selectively and one of the units being capable of acting as a standby unit while the other unit is in operation, an air receiver common to the two engine and compressor units and capable of receiving air from the compressor of the operating unit, and one or more air horns capable of being supplied with air from the air receiver, the combination of two substantially identical control systems each corresponding to one of the engine and compressor units, each of the control systems including relay operable control means capable of performing selected functions relating to the starting of the engine, the loading and unloading of the compressors whereby a substantially constant pressure is maintained in the air receiver, the operation of the air horns and the detection of failure due to any one of several possible causes, such control means including a plurality of delayed action type relays each capable, when energized, of completing a circuit after a predetermined period of time has elapsed, each of the delayed action type relays being capable of being energized upon the ocurrence of failure due to one of such possible causes, a plurality of relay operable annunciators each capable of being operated independently of the others in response to the action of one of the delayed action type relays, and relay means common to the several delayed action type relays and capable of shutting down the operating unit and starting the standby unit in response to the action of each of the delayed action type relays.

3. In a fog signal comprising a pair of engine and compressor units each consisting of a diesel engine and an air compressor capable of being driven by the engine, the engine and compressor units being operable selectively and one of the units being capable of acting as a standby unit while the other unit is in operation, an air receiver common to the two engine and compressor units and capable of receiving air from the compressor of the operating unit, and one or more air horns capable of being supplied with air from the air receiver, the combination of two substantially identical control systems each corresponding to one of the engine and compressor units, each of the control systems including relay operable control means capable of acting upon the starter motor of the engine whereby the motor is alternately operated and allowed to remain idle for predetermined periods of time, a delayed action type relay operable upon commencement of the starting cycle and capable, when energized, of completing a circuit after a predetermined period of time has elapsed, and relay means capable of shutting down the selected unit and starting the standby unit in response to the action of the delayed action type relay.

4. In a fog signal comprising a pair of engine and compressor units each consisting of a diesel engine and an air compressor capable of being driven by the engine, the engine and compressor units being operable selectively and one of the units being capable of acting as a standby unit while the other unit is in operation, an air receiver common to the two engine and compressor units and capable of receiving air from the compressor of the operating unit, and one or more air horns capable of being supplied with air from the air receiver, the combination of two substantially identical control systems each corresponding to one of the engine and compressor units, each of the control systems including a delayed action type relay capable of being energized when the voltage of the engine generator is lower than a predetermined voltage and the engine oil pressure is higher than a predetermined pressure, and capable, when energized, of completing a circuit after a predetermined period of time has elapsed, and relay means capable of shutting down the operating unit and starting the standby unit in response to the action of the delayed action type relay.

5. In a fog signal comprising a pair of engine and compressor units each consisting of a diesel engine and an air compressor capable of being driven by the engine, the engine and compressor units being operable selectively and one of the units being capable of acting as a standby unit while the other unit is in operation, an air receiver common to the two engine and compressor units and capable of receiving air from the compressor of the operating unit, and one or more air horns capable of being supplied with air from the air receiver, the combination of two substantially identical control systems each corresponding to one of the engine and compressor units, each of the control systems including a delayed action type relay capable of being energized when the oil pressure of the engine is lower than a predetermined pressure and the voltage of the engine generator is greater than a predetermined voltage and capable, when energized, of completing a circuit after a predetermined period of time has elapsed, and relay means capable of shutting down the operating unit and starting the standby unit in response to the action of the delayed action type relay.

6. In a fog signal comprising a pair of engine and compressor units each consisting of a diesel engine and an air compressor capable of being driven by the engine, the engine and compressor units being operable selectively and one of the units being capable of acting as a standby unit while the other unit is in operation, an air receiver common to the two engine and compressor units and capable of receiving air from the compressor of the operating unit, and one or more air horns capable of being supplied with air from the air receiver, the combination of two substantially identical control systems each corresponding to one of the engine and compressor units, each of the control systems including a delayed action type relay capable of being energized when the temperature of the engine cooling water is higher than a predetermined temperature and capable, when energized, of completing a circuit after a predetermined period of time has elapsed, and relay means capable of shutting down the operating unit and starting the standby unit in response to the action of the delayed action type relay.

7. In a fog signal comprising a pair of engine and compressor units each consisting of a diesel engine and an air compressor capable of being driven by the engine, the engine and compressor units being operable selectively and one of the units being capable of acting as a standby unit while the other unit is in operation, an air receiver common to the two engine and compressor units and capable of receiving air from the compressor of the operating unit, and one or more air horns capable of being supplied with air from the air receiver, the combination of two substantially identical control systems each corresponding to one of the engine and compressor units, each of the control systems including a delayed action type relay capable of being energized when the air pressure in the air receiver is lower than a predetermined pressure, the generator voltage is higher than a predetermined voltage and the temperature of the engine cooling water is higher than a predetermined temperature, or alternatively, when the air pressure in the air receiver is higher than a predetermined pressure, and capable when energized of completing a circuit after a predetermined period of time has elapsed, and relay means capable of shutting down the operating unit and starting the standby unit in response to the action of the delayed action type relay.

References Cited in the file of this patent

UNITED STATES PATENTS

| | | |
|---|---|---|
| 1,855,611 | Rudolph et al. | Apr. 26, 1932 |
| 2,197,175 | Cunningham | Apr. 16, 1940 |
| 2,389,204 | Ludi et al. | Nov. 20, 1945 |
| 2,511,631 | Gordon | June 13, 1950 |
| 2,601,429 | Buchner | June 4, 1952 |
| 2,707,779 | Gross | May 3, 1955 |
| 2,766,439 | Palm | Oct. 9, 1956 |
| 2,769,973 | Denkolm et al. | Nov. 6, 1956 |